Feb. 28, 1967
J. W. GOSS
3,306,624
DOLLY FOR MOVING BOXES OF GLASS
Filed May 19, 1965
2 Sheets-Sheet 1
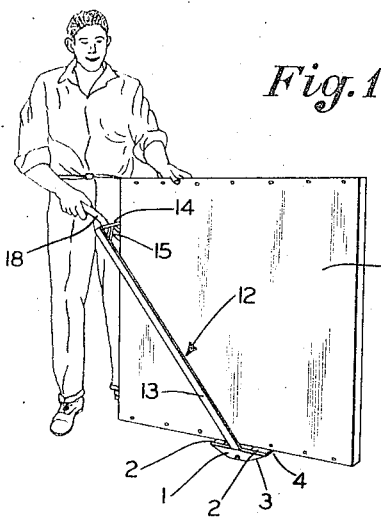
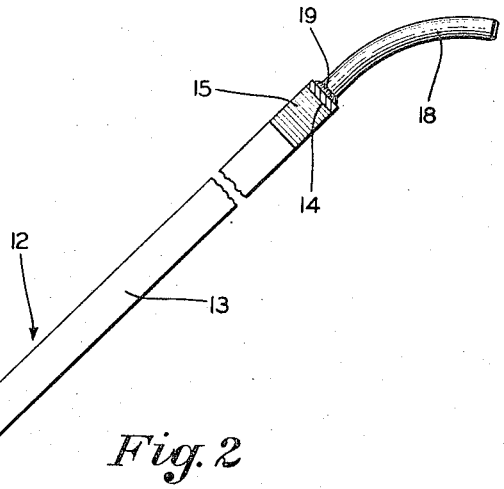
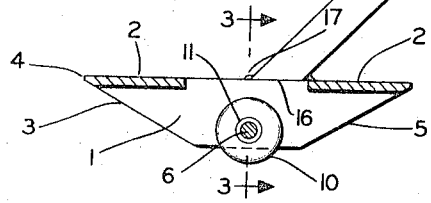
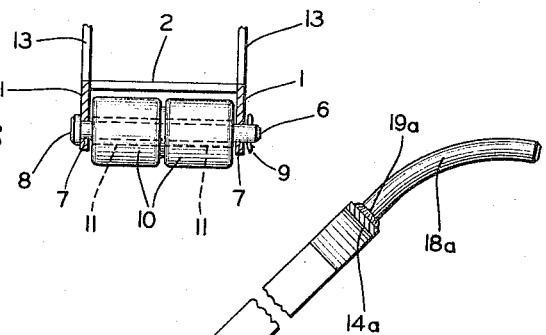
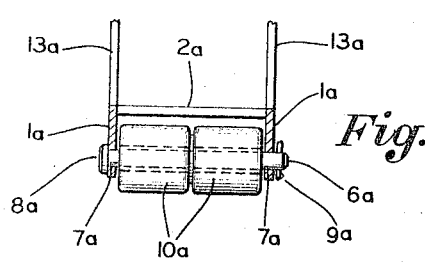
INVENTOR.
James W. Goss
BY
*Frease, Bishop, Johns & Schick*
ATTORNEYS Feb. 28, 1967   J. W. GOSS   3,306,624
DOLLY FOR MOVING BOXES OF GLASS
Filed May 19, 1965   2 Sheets-Sheet 2
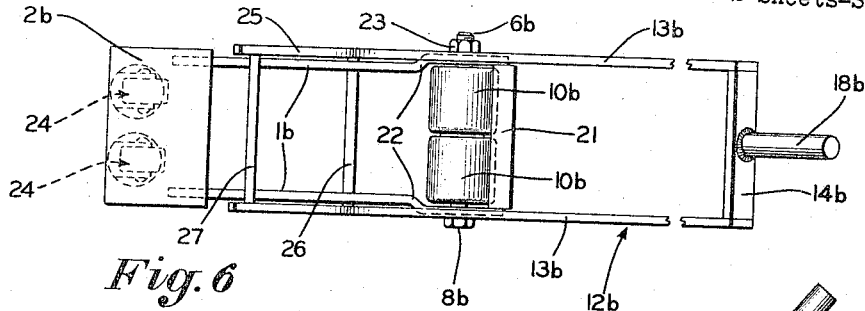
Fig. 6
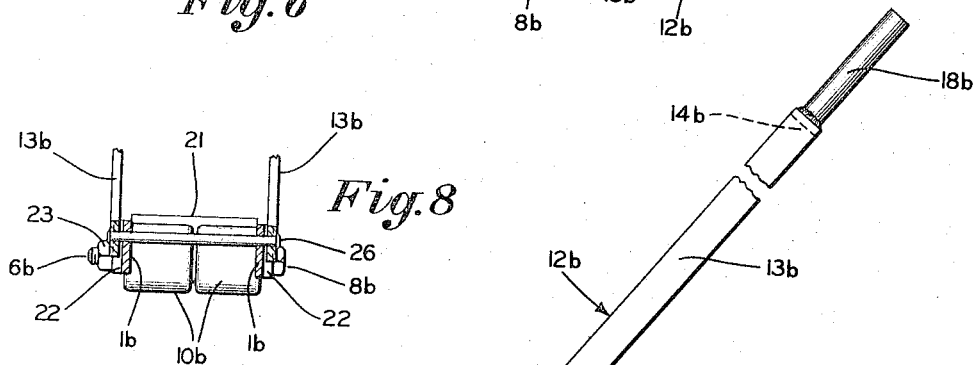
Fig. 8
Fig. 7
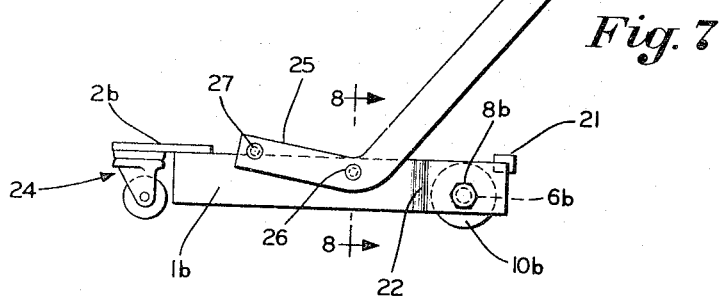
Fig. 10
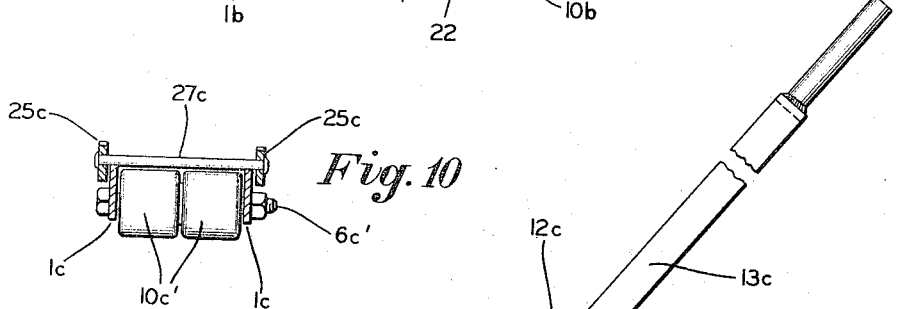
Fig. 9
INVENTOR.
James W. Goss
BY
Frease, Bishop, Johns & Schick
ATTORNEYS

United States Patent Office 3,306,624
Patented Feb. 28, 1967

3,306,624
DOLLY FOR MOVING BOXES OF GLASS
James W. Goss, 410 South St. SW., Warren, Ohio 43609
Filed May 19, 1965, Ser. No. 456,989
5 Claims. (Cl. 280—47.34)

The invention relates to dollies, and more particularly to a dolly especially adapted for moving relatively large rectangular articles of relatively narrow thickness, such as boxes of sheets of window glass.

It is customary to ship sheets of window glass packed ten or twelve in a rectangular box which is roughly three to four feet on a side and about two inches thick. These boxes are ordinarily stored vertically in racks provided especially therefor. Because of their size and weight, it is difficult for a workman to handle such boxes when unloading them from a truck or the like and conveying them to the rack where they are stored.

The primary object of the invention is to provide a dolly especially adapted for picking up and moving such boxes and depositing them in vertical position in the racks provided for the purpose.

Another object of the invention is to provide a dolly of the character referred to comprising a body portion of sufficient width to support a portion of the lower edge of such a box, with an inverted U-shaped handle connected to opposite sides of the dolly and of sufficient width to closely surround opposite sides of the box.

A further object of the invention is to provide a dolly of this type in which the body portion of the dolly is formed of two spaced side members connected at their upper edges by transversely disposed top means, roller means journalled between the side members, the inverted U-shaped handle extending upwardly and rearwardly from the body portion.

A still further object of the invention is to provide such a dolly in which the forward end of the body portion is tapered so as to be inserted beneath one corner of a box or other article to be moved.

Another object of the invention is to provide a dolly of the character referred to in which the legs of the inverted U-shaped handle are rigidly connected to the body portion.

A further object of the invention is to provide a dolly of this type in which the legs of the U-shaped handle are pivotally connected to the body portion and are provided with forwardly and upwardly disposed extensions for engaging the lower edge of a box to be moved.

A still further object of the invention is to provide such a dolly in which the roller means comprises a longitudinally aligned pair of rollers upon a single axle.

Another object of the invention is to provide a dolly of the character referred to in which the roller means comprises a longitudinally spaced pair of axles with rollers journalled upon each axle.

A further object of the invention is to provide a dolly of the type referred to in which an axle with a longitudinally aligned pair of rollers thereon is located near the rear end of the body portion, and a pair of casters is located at the forward end thereof.

The above objects together with others which will be apparent from the drawings and following description, or which may be later referred to, may be attained by constructing the improved dolly in the manner hereinafter described in detail and illustrated in the accompanying drawings, in which:

FIG. 1 is a perspective view of the simplest form of the invention, showing the manner in which a box of window glass, or the like, may be positioned upon the dolly for movement upon a floor;

FIG. 2 is an enlarged, longitudinal sectional view through the dolly shown in FIG. 1;

FIG. 3 is a transverse sectional view taken on the line 3—3, FIG. 2;

FIG. 4 is a longitudinal sectional view of a slightly modified form of dolly in which two longitudinally spaced axles, with rollers thereon, are provided;

FIG. 5 is a transverse, sectional view taken on the line 5—5, FIG. 4;

FIG. 6 is a top plan view of another modification of dolly;

FIG. 7 is a longitudinal, sectional view of the dolly shown in FIG. 6;

FIG. 8 is a transverse, sectional view of the dolly shown in FIGS. 6 and 7, taken on the line 8—8, FIG. 7;

FIG. 9 is a longitudinal, sectional view of a modification of the type of dolly shown in FIGS. 6, 7 and 8; and FIG. 10 is a transverse, sectional view taken on the line 10—10, FIG. 9.

Referring first to the simplest form of the invention shown in FIGS. 1 to 3, the dolly includes a body portion comprising the spaced, longitudinally disposed side members 1—1, and a flat, normally horizontal top which may comprise the flat members 2—2, all of which may be in the form of suitable metal plates.

As best shown in FIG. 2, at least the front edge of each side member 1 is preferably inclined upwardly and forwardly, as indicated at 3, and the forward edge of the front top member 2 is similarly tapered, providing the pointed forward edge 4.

In the embodiment of the invention illustrated in FIGS. 1 to 3, the rear edge 5 of each side member and the rear edge of the rear top member 2 are shown as formed in the same manner as the above described front edges of the side members and forward top member.

The top members 2 may be welded or otherwise rigidly connected to the side members 1, so as to provide a strong, rigid body portion, sufficiently rugged to support the boxes of glass for which it is intended.

An axle 6 is transversely disposed within the body portion, being shown in FIG. 3 as located through suitable apertures 7 in the lower central portions of the side members 1, a head 8 on the axle contacting the outer surface of one side member, and a cotter pin 9 being located through a suitable aperture in the other end of the axle for contact with the outer surface of the other side member to retain the axle in position in the body portion.

Roller means is provided upon the axle 6 for contact with the ground or floor, and is shown as comprising a longitudinally aligned pair of cylindrical rollers 10, journalled upon the axle 6, any conventional bearing means being provided for the rollers as indicated at 11. The rollers 10 may be formed of any suitable material capable of supporting the weight of the boxes to be carried upon the dolly.

Handle means is provided for the dolly in the general form of a relatively long and narrow inverted U-shaped handle, indicated generally at 12. As shown in the drawings, this handle may be formed of a flat bar of steel, or the like, comprising the two straight parallel legs 13 connected at their upper end as at 14.

If desired, an angular brace 15 may be mounted in the upper, rear end of the U-shaped handle. The lower ends of the legs 13 of the U-shaped handle are cut off at an angle, as indicated at 16 in FIG. 2, and are welded or otherwise rigidly connected to the upper edges of the side members 1, as indicated at 17. A hand grip 18 may be welded or otherwise attached to the upper rear end of the U-shaped handle 12, as indicated at 19 in FIG. 2.

As shown in FIGS. 1 and 2, the U-shaped handle 12 extends rearwardly and upwardly from the body portion of the dolly at approximately a 45° angle.

In using the dolly shown in FIGS. 1–3, for handling and moving boxes of glass and the like, the box of glass to be moved is placed in vertical position upon the floor or ground, and the dolly is tilted forwardly, engaging the tapered forward edge 4 beneath one lower corner of the box, and then tilted backwardly to raise this corner of the box above the floor or ground.

The box may then be pushed across the top members 2 of the dolly, and partially between the legs 13 of the inverted U-shaped handle, as indicated at B in FIG. 1. The box B may then be easily moved across the floor, by rolling the dolly upon the floor to the desired unloading station, where the dolly may be tilted backward, to raise the forward lower edge of the box so that it may be pushed into the rack, or the like, in which it is to be stored.

In FIGS. 4 and 5 is shown a slightly modified form of dolly in which the side members 1a are slightly longer than those in the dolly shown in FIGS. 1 to 3. The side members are otherwise substantially the same as those shown in the first form of the invention, the front edge of each side member being shown as upwardly and forwardly inclined, as indicated at 3a, terminating in the sharp corner 4a, and the rear edge is upwardly and rearwardly inclined, as indicated at 5a.

A spaced pair of axles 6a are transversely located through suitable openings 7a in the side members, each axle having journalled thereon a pair of rollers 10a. The inverted, substantially U-shaped handle 12a may be of the same construction as shown in FIGS. 1 to 3, the depending legs 13a thereof being cut off at an angle at the lower ends, as indicated at 16a, and welded or otherwise rigidly secured to the upper edges of the side members 1a, as indicated at 17a.

The top of the dolly may comprise a plurality of spaced transversely disposed top members 2a, welded or otherwise rigidly connected to the upper edge portions of the side members. A head 8a may be formed upon one end of the axle 6a, for contact with the outer surface of one side member 1a, and a cotter pin 9a being located through a suitable opening in the other end of the axle for contact with the outer surface of the other side member, for preventing accidental displacement of the axle.

A hand grip 18a may be welded as at 19a, or otherwise rigidly connected to the upper closed end 14a of the inverted U-shaped handle 12a. The forward top portion of the body of the dolly may be notched, as indicated at 20 in FIG. 4.

The use and operation of the dolly shown in FIGS. 4 and 5 is substantially the same as that described in FIGS. 1 to 3 above, a box of glass or the like being received upon the dolly and partially positioned between the legs of the inverted, U-shaped handle, as above described, for moving a box or the like upon the floor or ground.

A further modification of the invention is shown in FIGS. 6, 7 and 8. In this form of the invention the body of the dolly is formed of a spaced pair of longitudinally disposed side members 1b, the top member 2b welded or otherwise connected to the top edges of the forward ends thereof, and a transversely disposed bar 21 welded or otherwise rigidly connected to the upper rear corners of the side members.

The rear portion of each side member 1b may be rearwardly offset, as best shown at 22 in FIG. 6. An axle 6b is transversely located through suitable openings in the rear offset portions of the side members 1b, a head 8b being formed upon one end of the axle for contact with the outer surface of the adjacent side member, and a nut 23 being located upon the threaded end of the axle for contact with the outer surface of the other side member.

A pair of rollers 10b are journalled upon the axle 6b.

A pair of casters, indicated generally at 24, are shown as swiveled beneath the forward top member 2b. The handle, indicated generally at 12b, is of generally inverted U-shape, the depending legs 13b thereof having their ends angled forwardly and slightly upwardly, as shown at 25.

These legs 13b of the handle are pivoted upon the side members 1b, as indicated at 26, the angular portions 25 thereof extending forwardly and upwardly from the pivot point. The forward ends of the extensions 25 of the legs 13b of the U-shaped handle are connected together, as by the pin 27 which will contact with the upper edges of the side members 1b and limit forward pivotal movement of the handle, while the offsets 22 in the side members form stops limiting rearward movement of the handle.

A hand grip 18b may be welded or otherwise connected to the upper closed end 14b of the inverted U-shaped handle for manipulating the same. A box of window glass, or the like, as above described, may be supported upon the top member 2b and the transverse bar 21 of the body of the dolly shown in FIGS. 6 to 8 with a portion thereof received between the legs 13b of the inverted U-shaped handle 12b and may be moved across the ground or floor in the manner above described.

For raising the forward portion of the box off of the top member 2b, in order to remove the box from the dolly and push it onto a rack or the like, as above described, the handle 12b may be swung backward upon its pivot, the pin 27 in the extensions 25 of the legs thereof engaging the bottom edge of the box and raising it.

In FIGS. 9 and 10 is shown a slight modification of the dolly shown in FIGS. 6, 7 and 8. In this embodiment of the invention the side members 1c are of greater length than as shown in FIGS. 6, 7 and 8, extending entirely beneath the top member 2c. The rear portions of these side members are outwardly offset, as indicated at 22c, and a transversely disposed bar 21c is welded or otherwise rigidly connected to the upper rear corner portions thereof.

The rear axle 6c may be the same as the axle 6b shown in FIGS. 6, 7 and 8, and is provided with a pair of rollers 10c. A forward axle 6c' with rollers 10c' thereon is of the same construction and arrangement.

The substantially inverted U-shaped handle 12c is of the same construction as shown in FIGS. 6, 7 and 8, having the depending legs 13c, pivoted at 26c to the side members 1c, and having the forwardly and upwardly inclined extensions 25c at their lower ends, connected by the transversely disposed pin 27c. The use and operation of this embodiment of the invention is substantially the same as that of FIGS. 6, 7 and 8.

From the above it will be obvious that the dolly embodying the invention is especially adapted for picking up and moving boxes of window glass and similar heavy rectangular objects of relatively large length and width and relatively small thickness.

It will also be seen that the dolly is adapted for engaging under the lower corner of such an object, for raising it so that it may be easily pushed into place on top of the dolly, with a portion thereof received between the downwardly and forwardly inclined legs of the substantially inverted U-shaped handle, and that means is provided upon the dolly for raising the forward lower corner of the box, or other object being moved, so as to slide it from the dolly onto a rack or the like for storage.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A dolly for moving flat rectangular objects of relatively large length and width and relatively small thickness, said dolly having a relatively long narrow body portion comprising spaced longitudinally disposed side members, transversely disposed top means rigidly connected to the side members and unobstructed over the length thereof, transversely disposed axle means carried by the side members, roller means journalled upon the axle means, and an upwardly and rearwardly inclined substantially inverted long narrow U-shaped handle, said handle being formed of a steel bar comprising two straight parallel legs, the lower ends of which are connected to the side members, the upper ends of said legs being connected by a relatively short transversely disposed portion such that a vertical plane passed through the transversely disposed portion is spaced a substantial distance rearwardly of the rear edge of the top means, and an upwardly and rearwardly disposed hand grip connected to said transversely disposed portion.

2. A dolly for moving flat rectangular objects of relatively large length and width and relatively small thickness, said dolly having a relatively long narrow body portion comprising spaced longitudinally disposed side members, transversely disposed top means rigidly connected to the side members and unobstructed over the length thereof, transversely disposed axle means carried by the side members, roller means journalled upon the axle means, and an upwardly and rearwardly inclined substantially inverted long narrow U-shaped handle, said handle being formed of a steel bar comprising two straight parallel legs, the lower ends of which are rigidly connected to the side members, the upper ends of said legs being connected by a relatively short transversely disposed portion such that a vertical plane through the transversely disposed portion is spaced a substantial distance rearwardly of the rear edge of the top means, and an upwardly and rearwardly disposed hand grip connected to said transversely disposed portion.

3. A dolly for moving flat rectangular objects of relatively large length and width and relatively small thickness, said dolly having a relatively long narrow body portion comprising spaced longitudinally disposed side members, transversely disposed top means rigidly connected to the side members and unobstructed over the length thereof, transversely disposed axle means carried by the side members, roller means journalled upon the axle means, an upwardly and rearwardly inclined substantially inverted long narrow U-shaped handle, said handle being formed of a steel bar comprising two straight parallel legs, the lower ends of which are connected to the side members, the upper ends of said legs being connected by a relatively short transversely disposed portion such that a vertical plane through the transversely disposed portion is spaced a substantial distance rearwardly of the rear edge of the top means, and an upwardly and rearwardly disposed hand grip connected to the upper end of the handle.

4. A dolly for moving flat rectangular objects of relatively large length and width and relatively small thickness, said dolly having a relatively long narrow body portion comprising spaced longitudinally disposed side members, transversely disposed top means rigidly connected to the side members and unobstructed over the length thereof, transversely disposed axle means carried by the side members, roller means journalled upon the axle means, and an upwardly and rearwardly inclined substantially inverted long narrow U-shaped handle, said handle being formed of a steel bar comprising two straight parallel legs, the lower ends of which are connected to the side members, the upper ends of said legs being connected by a relatively short transversely disposed portion such that a vertical plane passed through the transversely disposed portion is spaced a substantial distance rearwardly of the rear edge of the top means, an angular brace in the upper end of said U-shaped handle, an upwardly and rearwardly disposed hand grip connected to the upper end of said handle, the forward ends of the side members being upwardly and forwardly inclined and the forward edge of the top means being forwardly and upwardly inclined.

5. A dolly for moving flat rectangular objects of relatively large length and width and relatively small thickness, said dolly having a relatively long narrow body portion comprising spaced longitudinally disposed side members, transversely disposed top means rigidly connected to the side members and unobstructed over the length thereof, spaced transversely disposed axles carried by the side members, roller means journalled upon the axles, and an upwardly and rearwardly inclined substantially inverted long narrow U-shaped handle, said handle being formed of a steel bar comprising two straight parallel legs, the lower ends of which are connected to the side members, the upper ends of said legs being connected by a relatively short transversely disposed portion such that a vertical plane through the transversely disposed portion is spaced a substantial distance rearwardly of the edge of the top means, an angular brace in the upper end of said U-shaped handle, and an upwardly and rearwardly disposed hand grip connected to the upper end of said handle.

References Cited by the Examiner

UNITED STATES PATENTS

| | | | |
|---|---|---|---|
| 1,436,665 | 11/1922 | Monro | 280—47.34 |
| 1,658,893 | 2/1928 | Gladding | 280—79.1 |
| 2,764,420 | 9/1956 | Morrissy | 280—47.24 |
| 3,035,847 | 5/1962 | Born | 280—47.24 X |
| 3,233,764 | 2/1966 | Hinsch | 280—47.24 X |

FOREIGN PATENTS 405,316  8/1943  Italy.

BENJAMIN HERSH, *Primary Examiner.*

C. C. PARSONS, *Assistant Examiner.*